(12) United States Patent
Hardiman et al.

(10) Patent No.: US 10,909,754 B1
(45) Date of Patent: Feb. 2, 2021

(54) VISUAL SCRIPTING FOR MULTI-DIMENSIONAL ELEMENTS

(71) Applicant: Amazon Technologies, Inc., Reno, NV (US)

(72) Inventors: Jeremy Hardiman, Kenmore, WA (US); Christian R. Lange, Snohomish, WA (US); Luis René Sempé Sosa, Irvine, CA (US); Adam Smith, Seattle, WA (US); Joseph Francis Stankowicz, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 629 days.

(21) Appl. No.: 15/680,606

(22) Filed: Aug. 18, 2017

(51) Int. Cl.
| | |
|---|---|
| *G06T 17/00* | (2006.01) |
| *G06T 19/00* | (2011.01) |
| *G06T 17/10* | (2006.01) |
| *G06T 13/40* | (2011.01) |
| *A63F 13/52* | (2014.01) |
| *G06F 8/34* | (2018.01) |
| *G06F 8/60* | (2018.01) |
| *G06T 19/20* | (2011.01) |

(52) U.S. Cl.
CPC ............ *G06T 17/005* (2013.01); *A63F 13/52* (2014.09); *G06T 13/40* (2013.01); *G06T 17/10* (2013.01); *G06F 8/34* (2013.01); *G06F 8/60* (2013.01); *G06T 19/20* (2013.01); *G06T 2210/12* (2013.01); *G06T 2210/61* (2013.01)

(58) Field of Classification Search
CPC ... G06F 8/34; G06F 8/60; G06T 17/00; G06T 17/005; G06T 19/00; G06T 19/20
See application file for complete search history.

(56) References Cited

PUBLICATIONS

"Using Sprite Generator to turn 3D into 2D in Unity," by Eric Muyser. Youtube video source: https://www.youtube.com/watch?v=m61SpuQUYvM Published Jul. 8, 2017 (Year: 2017).*
"Animation System Overview," from Unity User Manual (5.5), released Nov. 30, 2016 (Year:2016).*
"State Machine Basics," from Unity User Manual (5.5), released Nov. 30, 2016 (Year:2016).*
"State Machine Transitions," from Unity User Manual (5.5), released Nov. 30, 2016 (Year:2016).*

(Continued)

*Primary Examiner* — Steven J Hylinski
(74) *Attorney, Agent, or Firm* — Hogan Lovells US LLP

(57) ABSTRACT

Multi-dimensional models are supported for game creation via two-dimensional (2D) visual scripting systems. Visual scripting can utilize 2D nodes on a grid, where the nodes can interact through the use of input and output ports, and can be wired together to create gameplay behavior. A 2D rendering of a three-dimensional (3D) object (e.g., a mesh) can be added to the node grid for a gaming application. A scripting interface allows rules and ports to be created for specific aspects of the mesh, such as may relate to features, skeletons, or bounding boxes. Multiple scripting nodes can be associated with the same mesh such that the mesh is not duplicated in the visual scripting view port. The functionality for the 3D object can then be incorporated into the game based at least in part upon the associated nodes without manual coding or compilation.

16 Claims, 9 Drawing Sheets

(56) References Cited

PUBLICATIONS

"The Animator Controller Asset," from Unity User Manual (5.5), released Nov. 30, 2016 (Year:2016).*
"The Animator Window," from Unity User Manual (5.5), released Nov. 30, 2016 (Year:2016).*
"3D project to 2D conversion?" by Mathius777 on Unity Forum. Source:https://forum.unity.com/threads/3d-project-to-2d-conversion. 227856/ Published Feb. 12, 2014 (Year: 2014).*
"Flipbook Components in Blueprints:Guide on accessing and working with Flipbook COmponents in Bluepints," for Unreal Engine 4.9 released Aug. 31, 2015 (Year: 2015).*
"How do I import models from my 3D app?" from Unity User Manual (2017.1) Source: https://docs.unity3d.com/2017.1/Docunnentation/Manual/HOWTO-importObject.html (Year: 2017).*
"How to Create 3D Imposter Sprites in Unreal Engine 4—Part 1" by thejoey. Published Feb. 4, 2015. Source: idkudk.blogspot.com/2015/02/how-to-create-3d-imposter-sprites-in.html (Year: 2015).*
"How to Create 3D Imposter Sprites in Unreal Engine 4—Part 2" by thejoey. Published Feb. 4, 2015. Source: idkudk.blogspot.com/2015/02/how-to-create-3d-imposter-sprites-in_5.html (Year: 2015).*
"Render 3D Imposter Sprites," for Unreal Engine versions through 4.25. Accessed Jun. 11, 2020. Source: https://docs.unrealengine.com/en-US/Engine/Content/Tools/RenderToTextureTools/3/index.html (Year: 2020).*
"Render a Flipbook Animation," for Unreal Engine versions through 4.25. Accessed Jun. 9, 2020. Source: https://docs.unrealengine.com/en-US/Engine/Content/Tools/RenderToTextureTools/5/index.html (Year: 2020).*
"2D and 3D Mode Settings," published in Unity User Manual (2017.1) Source: https://docs.unity3d.com/2017.1/Documentation/Manual/2DAnd3DModeSettings.html (Year: 2017).*
"2D or 3D projects," published in Unity User Manual (2017.1) Source: https://docs.unity3d.com/2017.1/Documentation/Manual/2Dor3D.html (Year: 2017).*
"Mesh Collider," published in Unity User Manual (2017.1) Source: https://docs.unity3d.com/2017.1/Docunnentation/Manual/class-MeshCollider.html (Year: 2017).*
"Meshes," published in Unity User Manual (2017.1) Source: https://docs.unity3d.com/2017.1/Documentation/Manual/class-Mesh.html (Year: 2017).*
"Textures," published in Unity User Manual (2017.1) Source: https://docs.unity3d.com/2017.1/Documentation/Manual/Textures.html (Year: 2017).*
"Unity 2017.1 released," by SaraCeilia, published Jul. 11, 2017. Source: https://forum.unity.com/threads/2017-1-released.482680/ (Year: 2017).*
"Unity download archive," accessed Jun. 11, 2020, Source: https://unity3d.com/get-unity/download/archive (Year: 2020).*
"Unreal Engine 4.13 Released," by Chance Ivey. Publichsed Sep. 1, 2016. Source: https://www.unrealengine.com/en-US/blog/unreal-engine-4-13-released (Year: 2016).*
"Unreal Engine 4.9 Update Notes," Accessed Jun. 9, 2020. source: https://docs.unrealengine.com/en-US/Support/Builds/Release Notes/4_9/Updates/index.html (Year: 2020).*
"Unreal Engine 4.9 Released!" by Alexander Paschall. Published Aug. 31, 2015. Source: https://www.unrealengine.com/en-US/blog/unreal-engine-49-released (Year: 2015).*
"Unity 5.5 is ready for you," by Alex Lian. Published Nov. 29, 2016. (Year: 2016).*
"Mesh Preview Scenes—Unreal Engine 4 Documentation" for Unreal Engine 4.13, released Sep. 1, 2016 (Year: 2016).*
"Question about putting 3D animation into 2D game," by Zephyr77. Published Mar. 17, 2016. Source: https://forums.unrealengine.com/development-discussion/animation/76460-question-about-putting-3d-animation-in-a-2d-game (Year: 2016).*
"Paper 2D," for Unreal Engine 4.9, released Aug. 31, 2015. Source:https://docs.unrealengine.com/en-US/Engine/Paper2D/index.html (Year: 2015).*
"Project 3D to 2D with Camera Coords," by thehen. Published Mar. 25, 2014. Source: https://forums.unrealengine.com/development-discussion/content-creation/1185-project-3d-to-2d-with-camera-coords (Year: 2014).*

\* cited by examiner

VISUAL SCRIPTING FOR MULTI-DIMENSIONAL ELEMENTS

BACKGROUND

The widespread adoption of portable computing devices, such as smartphones and tablet computers, has resulted in a corresponding increase in the number of electronic games available to players. Many of these games offer realistic worlds and three-dimensional gameplay. The creation of these games can be complicated, however, and game developers often are unable to locate a sufficient number of skilled developers to support the vast array of gaming offerings. While there are various tools available that can assist the development of these games, the tools do not always provide the type of support needed, or only provide limited functionality.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for development of electronic gaming applications. In particular, various approaches provide for the inclusion of multi-dimensional (e.g., three-dimensional or 3D) elements in two-dimensional (2D) visual scripting engines. Various game engines and tool chains support visual scripting as a development tool. Visual scripting in some embodiments involves the use of 2D nodes on a grid that can interact through the use of input and output ports, and can be wired together to create gameplay behavior. Various embodiments provide the ability to add a 2D rendering of a 3D character model (e.g., a 3D mesh) to the node grid for a gaming application. A scripting interface can allow rules and ports to be created for specific aspects of the mesh, such as features, skeletons, or bounding boxes. Multiple scripting nodes can be associated with the same mesh such that the mesh is not duplicated in the visual scripting view port. The functionality for the 3D object can then be incorporated into the game based at least in part upon the associated nodes without manual coding or compilation.

Various other functions can be implemented within the various embodiments as well as discussed and suggested elsewhere herein.

Figure 1A:
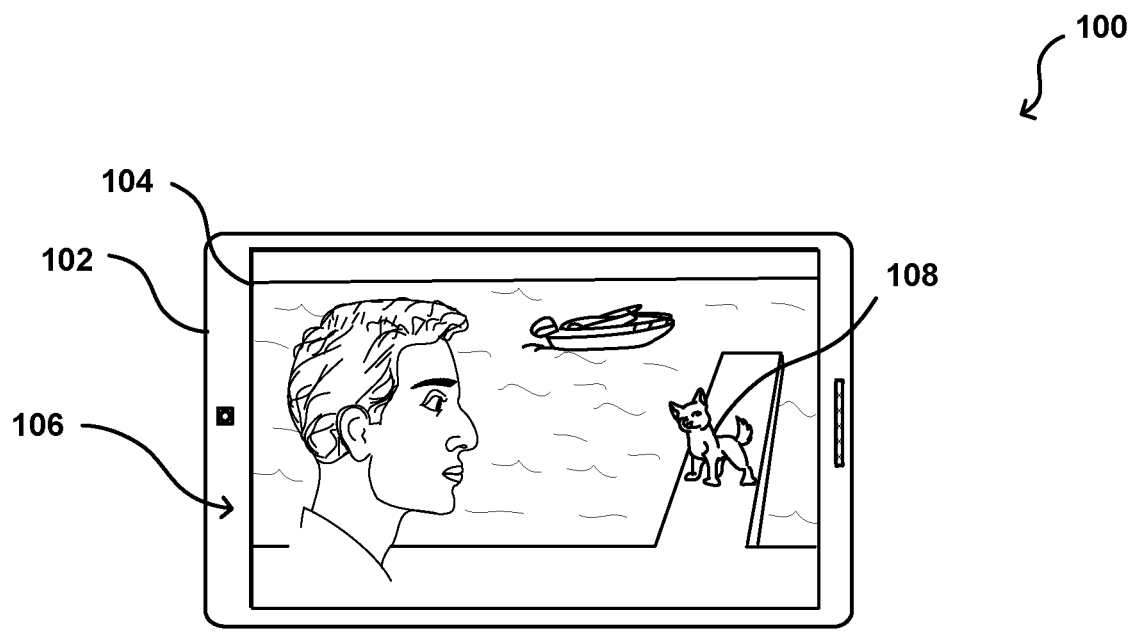
FIGS. 1A and 1B illustrate example states of an electronic gaming application that can be rendered in accordance with various embodiments.
Figure 1B:
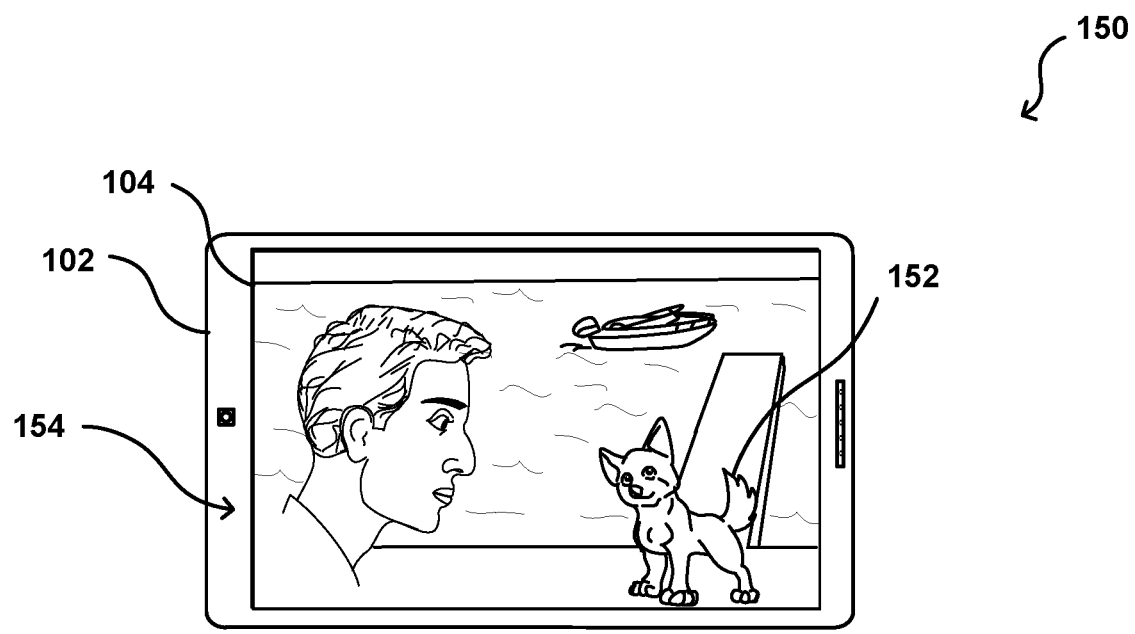

Video and electronic gaming applications often attempt to provide a realistic, or at least cinematic, experience, wherein characters and objects in the game act as they would in, for example, the real world. This typically involves modeling of the characters and objects in such a way that they can be controlled to provide realistic responses and actions. As an example, FIGS. 1A and 1B illustrate example displays 100, 150 of states of a gaming application that can be rendered and displayed in accordance with various embodiments. In this example, a first frame of gaming content is displayed on a display screen 104 of a client device. The gaming device can include any appropriate type of device for executing, rendering, and/or displaying gaming content, as may include gaming consoles or handheld consoles, as well as other computing devices such as smart phones, tablet computers, wearable computers (e.g., smart glasses or watches), desktop or notebook computers, and the like. In this example, the frame includes a representation of a person 106, a dog 108, and other objects such as a boat, a dock, and water. In order to increase the realism of the scene, objects may move between rendered frames. This can include, for example, waves moving in the water and the boat moving across the water in the background of the scene. The human and dog characters (or "objects" as also referred to herein) can also move in the scene, as may be based upon user input, gaming artificial intelligence (AI) or instructions, or other such input.

In addition to these basic gaming actions, the realism can be further increased by causing the character objects, as well as potentially other objects in the scene, to react to their environment. For example, the dog 108 rendered in this scene moves down the dock between frames to be displayed with a representation 152 that is closer to the representation 154 of the human character in the second frame 150. It should be understood that "frame" is used herein to reference the content rendered on the screen at a specified point in time, and that various methods for rendering content may not include separately rendered frames in various embodiments. As the dog moves, its representation will be rendered to appear to be at different locations, as appropriate, and the size of the representation can be adjusted accordingly. In order to increase the realism of the scene, it may be desirable to have the representation of the person move his head, and potentially his eyes, to correspond to the movement of the dog. If the person is rendered using a three-dimensional character model, as may involve shading of a three-dimensional wire mesh in some embodiments, then the tracking may involve rendering of a rotation of the character's head to correspond to the motion of the dog. This then involves at least determining the appropriate motion of the person's head to correspond to the motion of the dog in three dimensions. Such an action can be relatively difficult, or at least time consuming, to code into the game for various developers. As mentioned, there are a large number of game producers and not every developer will have the same skill set, such that various tools can be beneficial in developing the games (or other dynamically rendered content).

One approach involves use of a visual scripting language to allow for a simplified development process. A visual scripting language in at least some embodiments is node based, wherein each object to be rendered in a scene, for example, can be rendered as a node in the interface. Nodes can also represent operations, events, variables, function calls, and the like. The nodes can have various properties set that determine the behavior of the objects in the game, and can be linked together for actions that may involve two or more objects. There can be a set of node types from which a developer can select, where each node type corresponds to a particular function. In some embodiments developers can create or download new node types, or modify the functionality of existing types. Such an approach provides for the ability to create gameplay without the need for manual scripting or compiling of code. In some embodiments, the interface allows for the extending of existing classes that can then the added and arranged in a node graph, allowing for the inclusion of custom logic and components, appropriate variables and event handlers, etc.

Figure 2A:
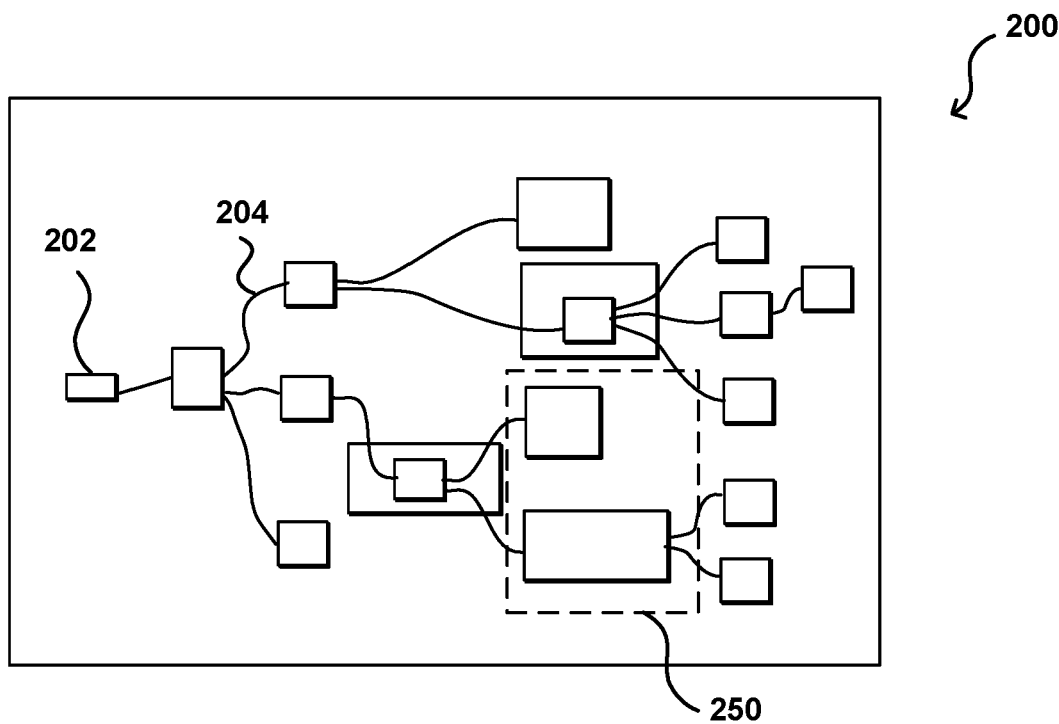
FIGS. 2A and 2B illustrate example node configurations of a visual scripting language that can be generated in accordance with various embodiments.
Figure 2B:
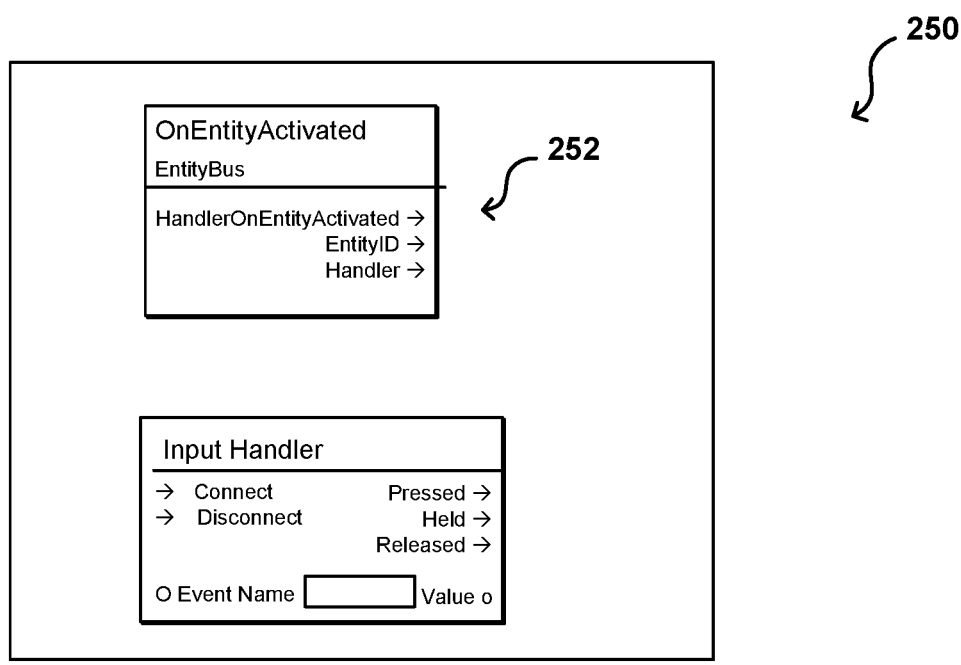

FIG. 2A illustrates an example node configuration 200 that can be generated using an example visual scripting interface in accordance with various embodiments. As illustrated, there can be various nodes 202 of different types added to the interface. This may correspond to a particular scene or level in the game, for example, where a parent node may represent the scene or level and other nodes in the interface represent the objects, actions, and functionality for the scene. The nodes can be connected using links 204 to indicate not only the relationship in the level tree, for example, but also which objects can have an impact on other objects, or can provide input to other nodes. FIG. 2B illustrates a zoomed view of a selected portion 250 of the node hierarchy. In this example, the contents 352 of example nodes are visible. Each node can have, for example, a name, a type, a set of inputs, a set of outputs, and a type of action or functionality to be executed, among other such options. As with various visual development languages, a developer can select or add nodes to the level and specify settings on these nodes to determine their functionality and interactions.

A developer can use the visual scripting language to perform the scripting for all gameplay for a gaming application. The system can be any appropriate visual scripting system, such as the Blueprints visual scripting system in the Unreal Engine, among other such options. In such a visual scripting system, each gameplay element can be represented by a node such as those illustrated in FIG. 2A. The interface can also include other types of nodes or gameplay elements that can be linked together, using "wires" or other visible or virtual connections, as may include variables, functions, events, and the like. The linking of the various types of elements in a graph for a level can be used to generate relatively complex gameplay elements. The configuration and linking of nodes can enable a developer to quickly perform tasks such as to insert characters, establish game rules, and configure the movements of a virtual camera, among others. When adding characters, developers can specify content to use for rendering the characters, or other objects, as may include various models, textures, meshes and the like. The characters may also be linked to objects they carry or wear, as well as nodes for special skills or abilities available to the characters, etc. In the example node graph of FIG. 3A, the execution for a level may occur along the wires from left to right, although other configurations and execution approaches can be used as well in accordance with various embodiments. The execution flow can be monitored through the interface during game execution, which can assist with debugging and additional development.

While many tool chains, game engines, and other gaming tools support such visual scripting tools, the tools are somewhat limited by their representation of objects using two dimensional abstract box nodes displayed on a node grind. While the nodes can interact through the use of input and output ports, which can be wired together to create gameplay behavior, conventional systems do not provide adequate support for three-dimensional objects. As mentioned with respect to the example of FIG. 1A, it may be desirable to have three-dimensional characters represented by the nodes to provide for various functionality relating to those characters in three dimensions.

Accordingly, approaches in accordance with various embodiments provide for the inclusion of a multi-dimensional gameplay element that can render in an example node grid for a gaming application. The visual scripting interface can then enable game developers to write rules, as well as to generate input and output ports and perform other node-related actions, based at least in part upon the multi-dimensional (3D) elements. The multi-dimensional elements can include, for example, 3D meshes or 4D elements that include time components, along with other complex renderable objects. These can include, for example, elements with a base renderable component or skeletal hierarchy, or a set of linked one- or two-dimensional elements, among other such options. The process can involve, for example, the location of a particular joint or feature of a character skeleton, or the position and shape of the bounding boxes for a 3D mesh, among other such options. In some embodiments, multiple scripting nodes can be associated with a single 3D mesh, in order to provide for multiple types of functionality. In some embodiments the different nodes for a mesh can be color coded, and/or represented by different layers, such that the mesh is not duplicated in the visual scripting view port or on the node graph. The inclusion of 3D meshes on the node graph enables a developer to tie nodes together based upon specific features of the meshes.

Figure 3:
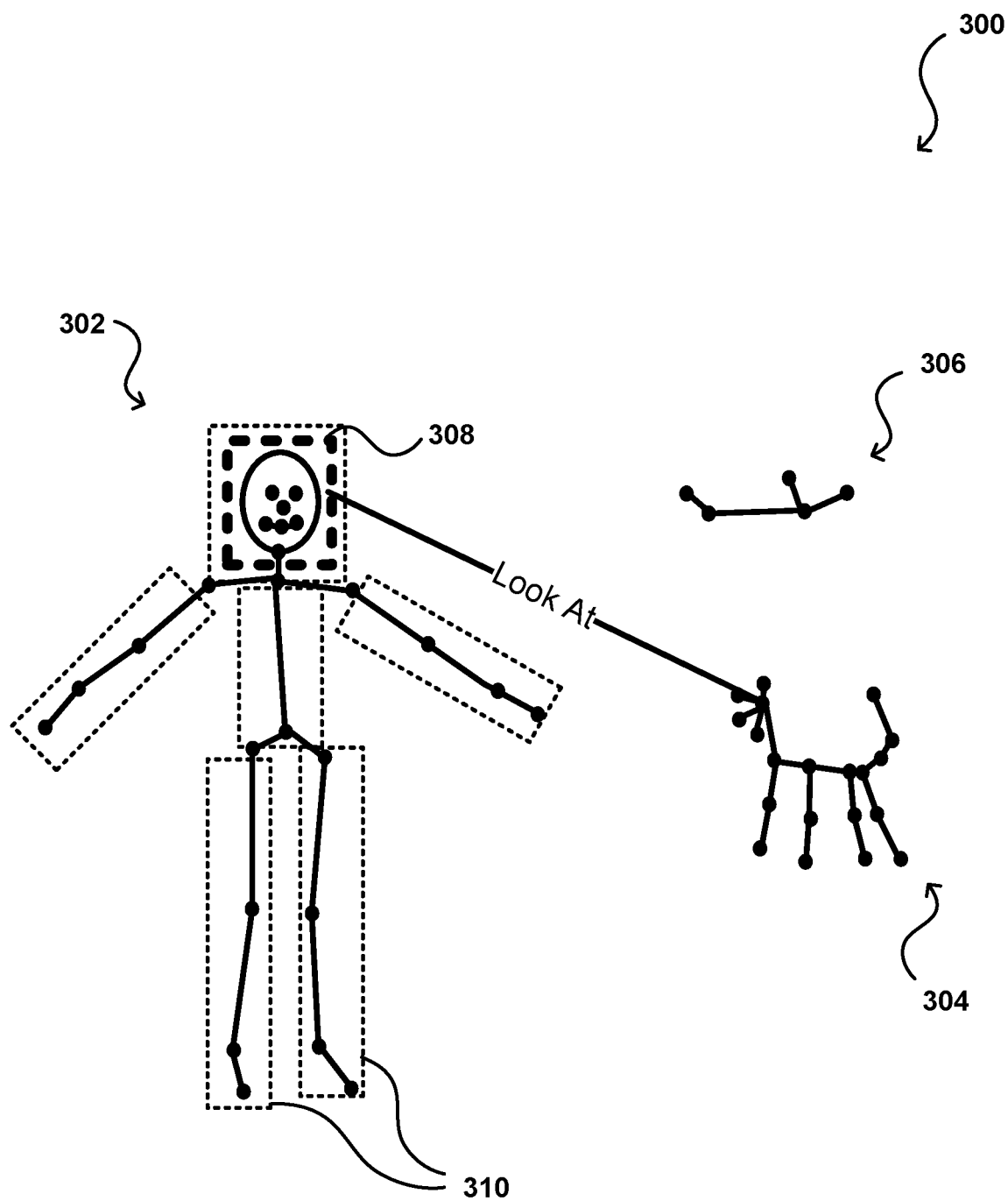
FIG. 3 illustrates example character models that can be utilized in accordance with various embodiments.

FIG. 3 illustrates an example of mesh representations 300 that can be utilized in accordance with various embodiments. As mentioned, there can be skeletons included for each of a set of objects to be rendered in a scene, such as for a human 202, a dog 204, and a boat 206 as in the example of FIG. 1A. The skeletons can include specific features of the mesh, which can then be linked to other nodes or meshes in the grid. For example, as mentioned it might be desirable to have the person 202 watch the dog 204 as the dog moves throughout the scene. In this example, a node 208 corresponding to the head of the person when rendered can be linked to the dog, either the entire skeleton 204 or a specific feature of the dog, such as an eye or face bone of the dog's skeleton. The ability to link the character's head to a feature of the dog provides a simple way to specify a type of interaction to be executed during a game session. A similar action could be taken if the character was to watch or follow the boat, etc.

The illustrated 2D representation of a 3D mesh (also referred to herein as a "2D mesh") for the person 202 also includes a set of bounding boxes 210. These boxes can be used to specify certain types of interactions for the character. For example, if these are hit boxes then specific actions can be triggered in response to contact of an object with the 3D coordinates of the hit boxes. For example, if the dog character 204 comes into contact with a head or face box of the character, then the dog can be animated to lick the person's face and the person can be triggered to perform an action in response. Similarly, if the dog brushes against the hit box of one of the person's legs then the person character can be configured to take a specific action, such as to have the leg covered in dog hair or cause the character to lean down and pet the dog, among other such actions. Similarly, settings can be set for the various hit boxes such that if the boat splashes water on an arm or leg of the person, then an animation or shading of that portion to represent that portion getting wet can be performed. Various other actions can take place based upon interactions with at least one coordinate of one of the hit boxes for a character as specified by the node and any linked nodes or objects in the grid.

Such an approach enables a developer to quickly select the appropriate points on a mesh or skeleton for a specific action, as opposed to inputting a name or selecting a feature or part from a drop down list or other such element. For complex characters there may be many different features of the skeleton or mesh, and the corresponding names may be difficult to determine. By using a representation of the mesh, a developer can attach a wire directly to the appropriate point on the skeleton, or to the appropriate bounding box, etc. Further, drawing a link from the person's head to the dog for a look action can be much simpler and faster than determining and selecting the corresponding nodes and features, specifying the selected action, and testing to ensure that the correct features were selected. The wires in at least some embodiments can also be rendered with a 3D appearance such that the connected nodes or features can be readily determined through the interface.

In some embodiments the functionality can be provided by default, while in others a developer might need to allow for the inclusion of 3D models or meshes for a scene graph, where some developers may prefer a more conventional approach. In some embodiments there may be a library of character models for a game, and a developer can select a specified model, such as by dragging and dropping that model onto the appropriate location of the graph. The visual scripting engine can work with (or include) a rendering engine that can generate an appropriate rendering of the model or mesh on the scene graph. A rendering engine or pipeline can be particularly valuable for complex characters or characters with several node associations. In some embodiments the rendering engine can also generate representations of the hit boxes, bounding boxes, or other relevant elements for a character or object to be displayed in the visual scripting interface. Further, for complex characters there may be such a large number of features or amount of metadata that not all the information can usefully be displayed on a scene graph at one time, such that various filtering or selection options may also be provided to get different types of views of a character or object. Such approaches enable a conventional visual scripting tool to become a type of three-dimensional visualization tool for game development and testing.

In addition to game development, such interfaces can also be provided to players to allow for the creation or modification of gaming levels or scenes. For example, certain games provide users the tools to create levels or new players, and assign functionality to various objects and gameplay elements. A visualization tool such as described herein can be provided as a game interface whereby players can drop characters onto a scene and then link portions of those characters and other gameplay in order to define interactions and other such actions. Other dynamic rendering applications can also take advantage of such development tools, where those applications can include augmented and virtual reality applications, among others.

Figure 4:
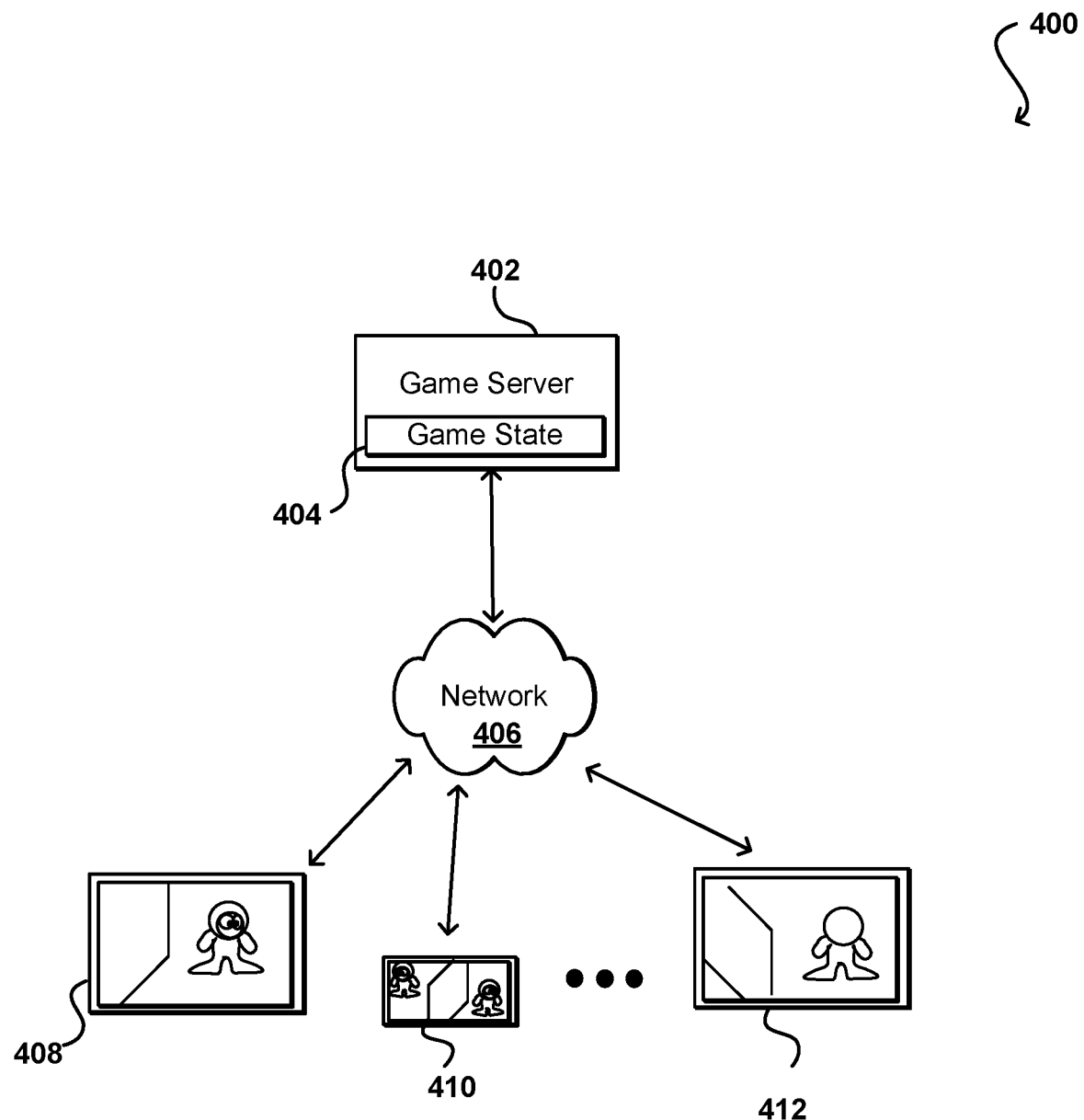
FIG. 4 illustrates players to a multiplayer online gaming session that can be developed in accordance with various embodiments.

FIG. 4 illustrates an example gaming configuration 400 that can be managed in accordance with various embodiments. In this example, a gaming application is hosted on at least one game server 402. The game server 402 can be a local gaming machine or a remote server operated by a game provider, among other such options. In this example the game offers multiplayer capability, whereby multiple players can utilize respective devices 408, 410, 412 to connect to the game server 402 over at least one network 406, such as the Internet, a local area network, a dedicated gaming network, a peer-to-peer network, or a cellular network, among other such options and combinations thereof. The players can join in a session of the game with state data that is managed by a game state component 404 of the game server. In some embodiments one or more game servers 402 can execute the game, while in others the servers can manage game state for instances of the game executing on the various player devices 408, 410, 412. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 402 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 402. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

Figure 5:
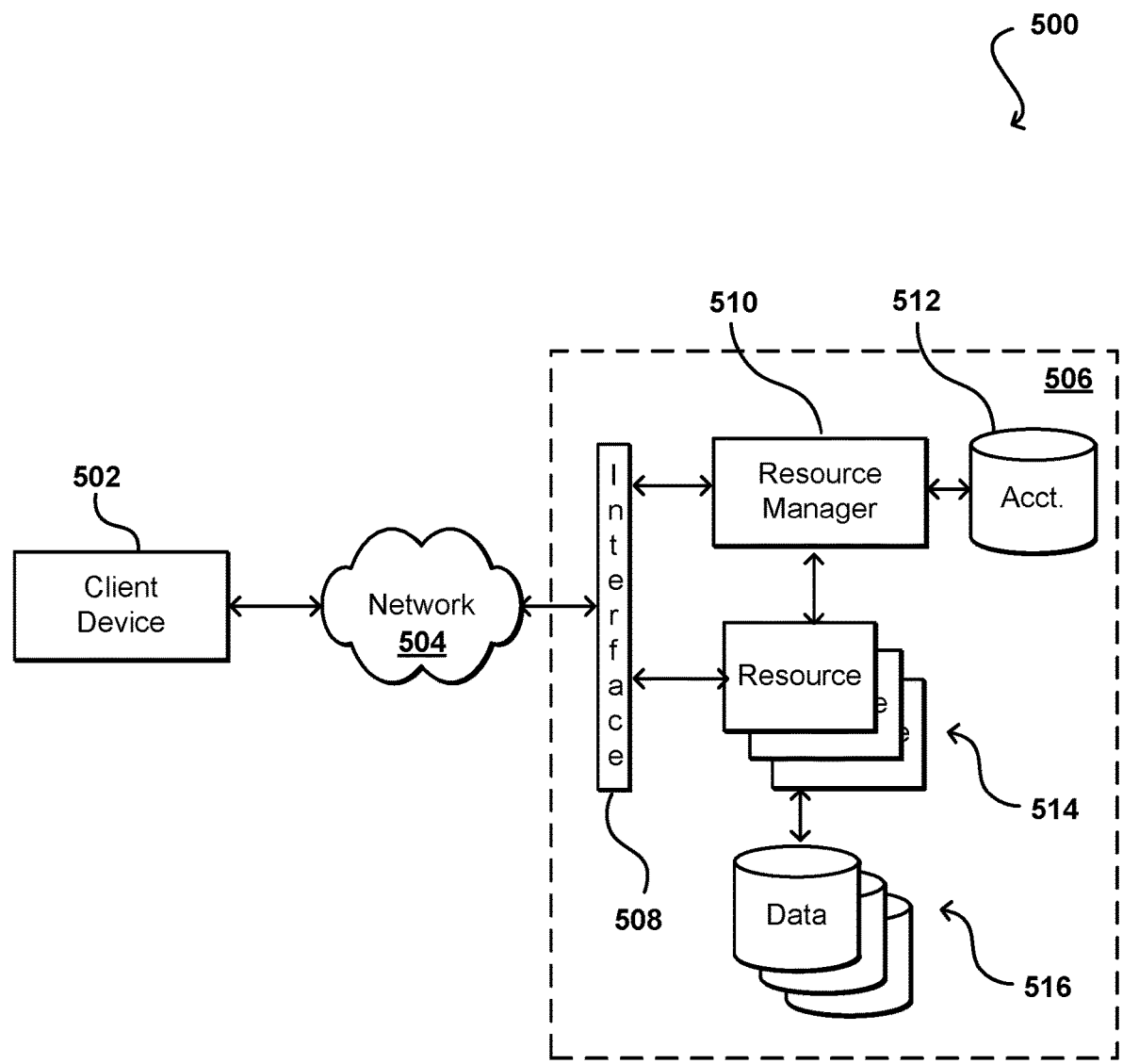
FIG. 5 illustrates an example environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
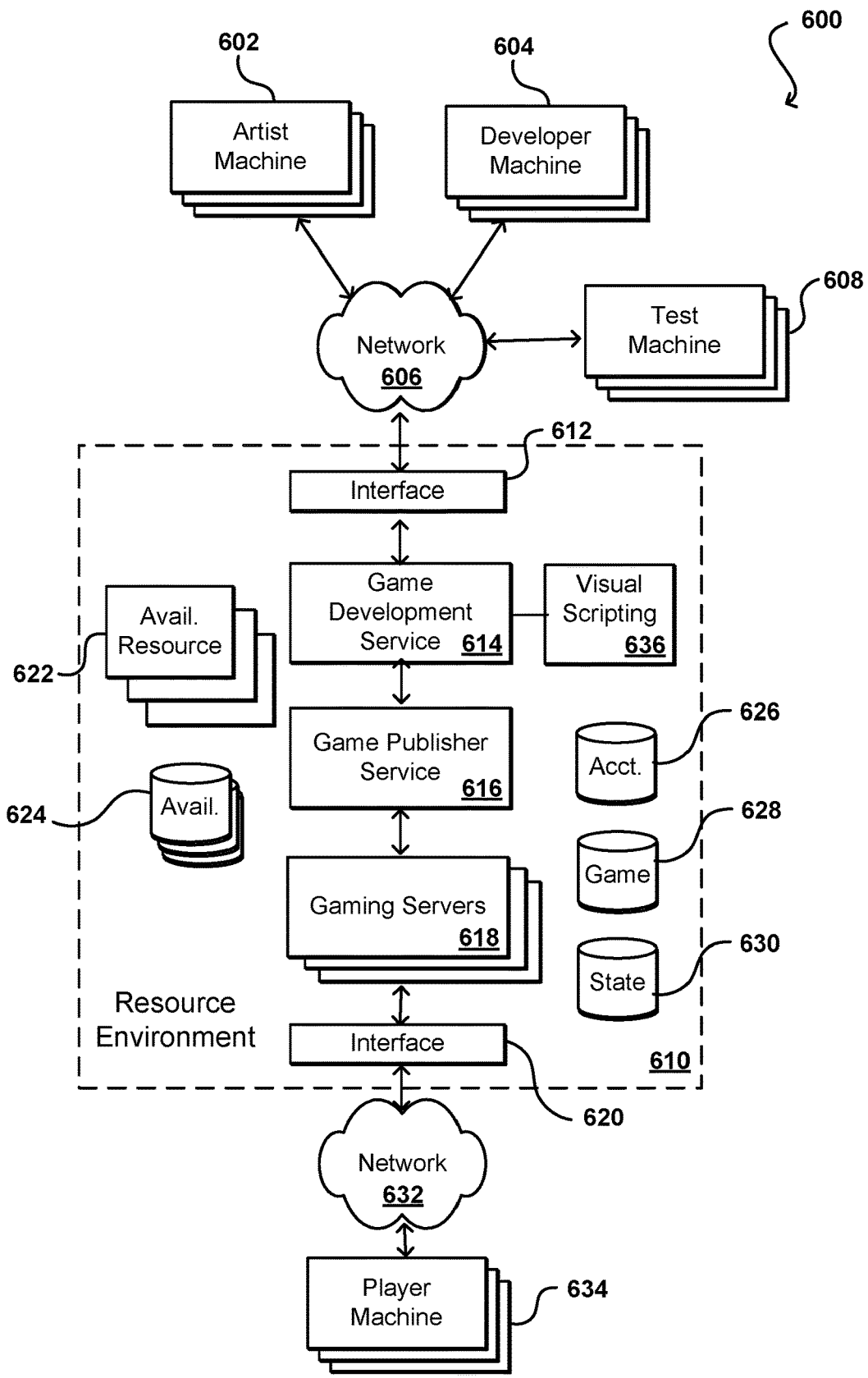
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in the resource environment 610 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can utilize a visual scripting service 636 as discussed herein, where the scripting interface can be rendered on the appropriate artist or developer machine, and the input used by the game development service 614 to generate the relevant script or code for the gaming application. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 7:
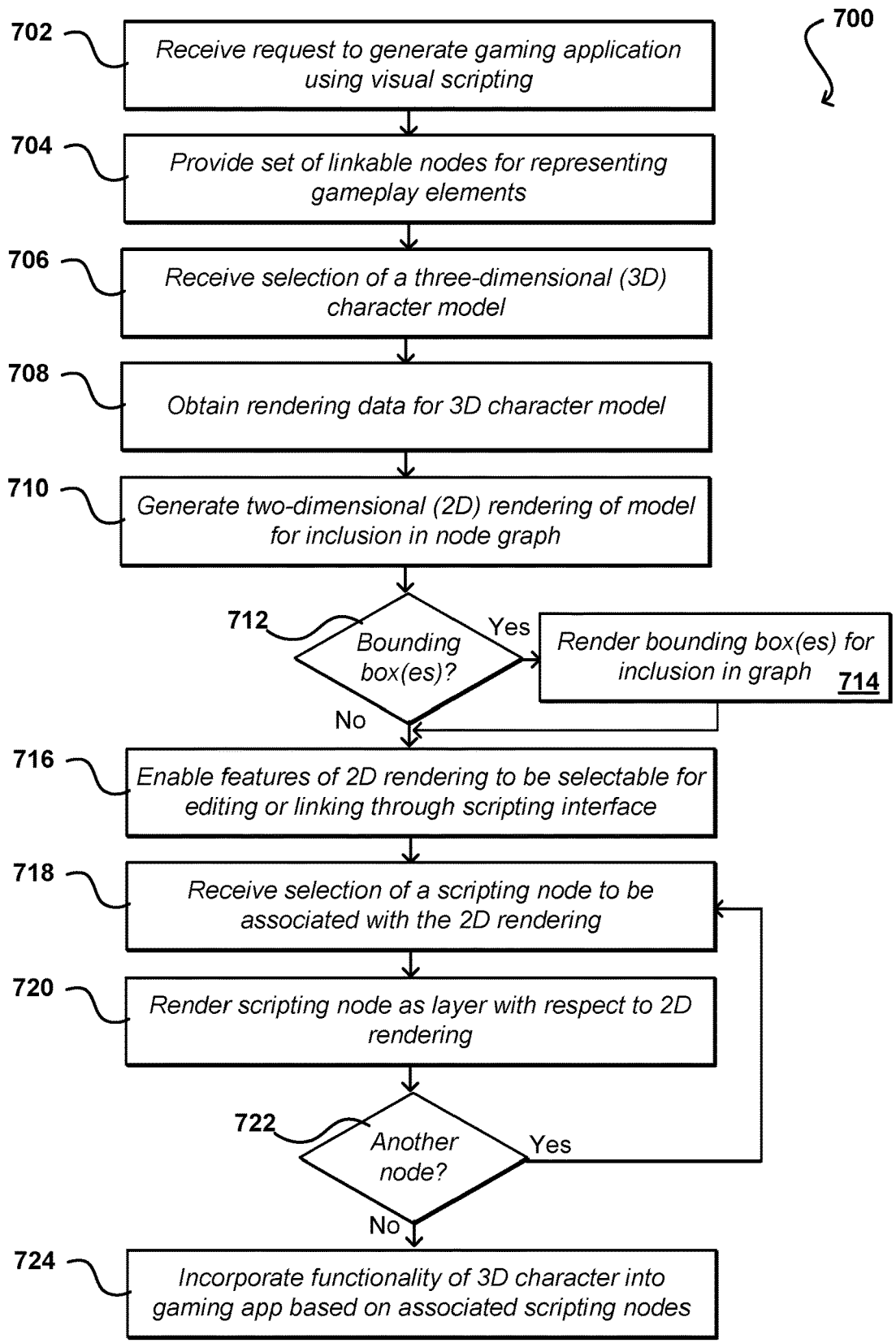
FIG. 7 illustrates an example process for adding three-dimensional elements to a two-dimensional visual scripting interface that can be utilized in accordance with various embodiments.

FIG. 7 illustrates an example process 700 for including three-dimensional elements in a two-dimensional scripting interface that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a request is received 702 to generate (or update) a gaming application using visual scripting. As mentioned, this can relate to a two-dimensional, node-based visual scripting service, among other such options. In some embodiments, a game developer might initiate a gaming application that can involve several scenes or levels, each of which may have a separate visual scripting node graph or interface page, which may be accessible by several authorized individuals. As part of the interface, a set of linkable nodes (or types of nodes) can be provided 704 for representing various gameplay elements for the scene. The gameplay elements can include any appropriate elements as discussed herein, as may relate to characters, objects, actions, variables, and the like.

During development of the game a selection can be received 706, or other input indicated, corresponding to a three-dimensional character model. Various other three dimensional (3D) object representations can be selected as well as discussed herein. This can be from a set of models, a newly created model, etc. A set of rendering data can be obtained 708 for the model, as may include a wire mesh or frame, texture or shading data, and the like. Using at least some of that data, a two-dimensional (2D) rendering of the character model can be generated 710, such as by passing the data to a rendering engine or pipeline that is able to generate a two-dimensional representation of the wire mesh with a set of representative features or points. A determination can be made 712 as to whether there are any bounding boxes for the model, as may be specified as part of the model or determined using the model. If so, one or more boxes can also be rendered 714 as appropriate for inclusion on the graph. This can enable boundaries of the character when rendered to act as action points, such as where an object might come across a position of a corresponding portion of the character when rendered.

Once rendered and displayed through the visual scripting interface, features of the 2D rendering can be enabled 716 to be individually selectable for editing, linking, or other actions through the scripting interface. As mentioned, this can include linking specific features of the mesh to other nodes, defining actions for interactions with bounding boxes, setting specific gameplay behaviors for rendering elements, and the like. The scripting engine can receive 718 selection of a scripting node to be associated with the 2D rendering, whether associated with the entire character model, a feature, a bounding box, a skeleton, or another such aspect. The scripting node can then be rendered 720 and displayed as a layer over top of, or otherwise positioned with respect to, the 2D rendering. If it is determined 722 that there is to be at least one additional node for the 2D rendering, additional scripting nodes can be rendered and displayed as separate layers, which can be independently selectable or viewable, and can be colored or otherwise differentiated based on factors such as node type or action. As the nodes are selected and their values set, and appropriate links or wires generated, the functionality for the 3D character can be incorporated 724 into the gaming application based at least in part upon the associated scripting nodes, with little to no manual scripting or compilation required on the part of the person responsible for creating the nodes.

Figure 8:
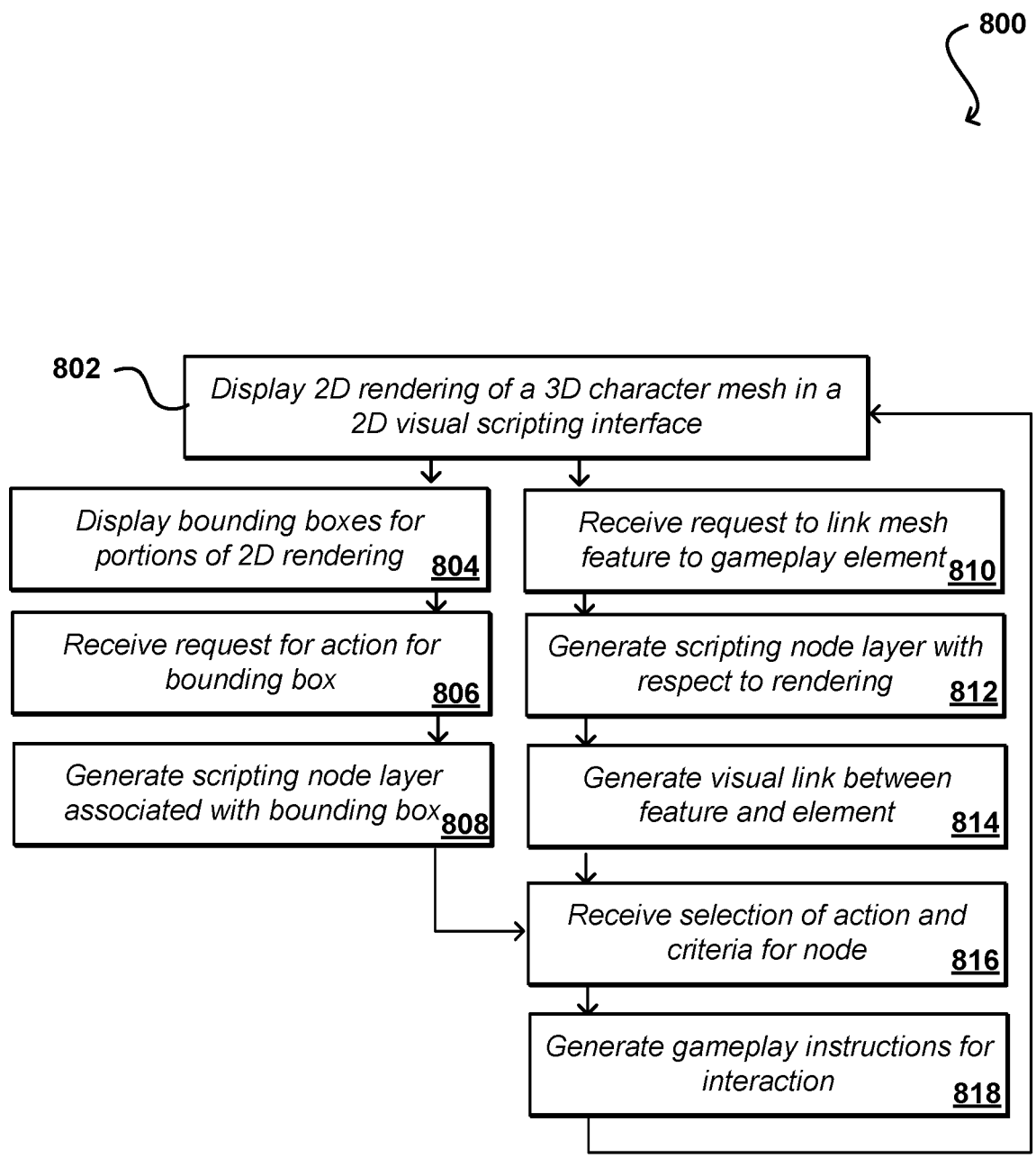
FIG. 8 illustrates an example process for utilizing three-dimensional features in a two-dimensional visual scripting interface that can be utilized in accordance with various embodiments.

FIG. 8 illustrates an example process 800 for generating gameplay functionality for a 3D character that can be utilized in accordance with various embodiments. In this example, a 2D rendering of a 3D character mesh is displayed 802 through a 2D visual scripting interface. The rendering can be any appropriate rendering, such as is discussed with respect to the process of FIG. 7. In this example, there are multiple options that a user can take with respect to the rendering, two of which are illustrated in the flowchart. For one action, a set of bounding boxes can be displayed 804 for portions of the 2D rendering. These can include 2D renderings of the 3D bounding boxes, which can represent portions of the character for which different actions can occur. For example, in a paint gun game there might be different animations if the character is hit in the arm than in the leg or torso. A request for a specific action with respect to the bounding box can be received, such as to add a type of node corresponding to the action. A scripting node layer can be generated 808 that can be associated with the bounding box, and which can enable various parameters to be set, can accept input and provide output, and can be wired to other nodes in the scripting interface, among other such options. As another option, a request can be received 810 to link a specific mesh feature to another gameplay element, which can be presented by a node in the graph in some embodiments. A scripting node layer can be generated 812 with respect to the 2D rendering that can enable specification of an action or interaction to be generated with respect to the linked elements. A visual link (e.g., a graphic wire) can be generated 814 between the feature and the designated element. For either node, a selection of an action or at least one criterion can be received, such as to perform an animation or perform a specific task in response to an interaction with at least an associated portion of the character. The gameplay instructions for the interaction, as defined by the node, can be generated 818 and incorporated into the gaming application. Various other types of nodes and interactions can be specified or generated as well within the scope of the various embodiments.

Figure 9:
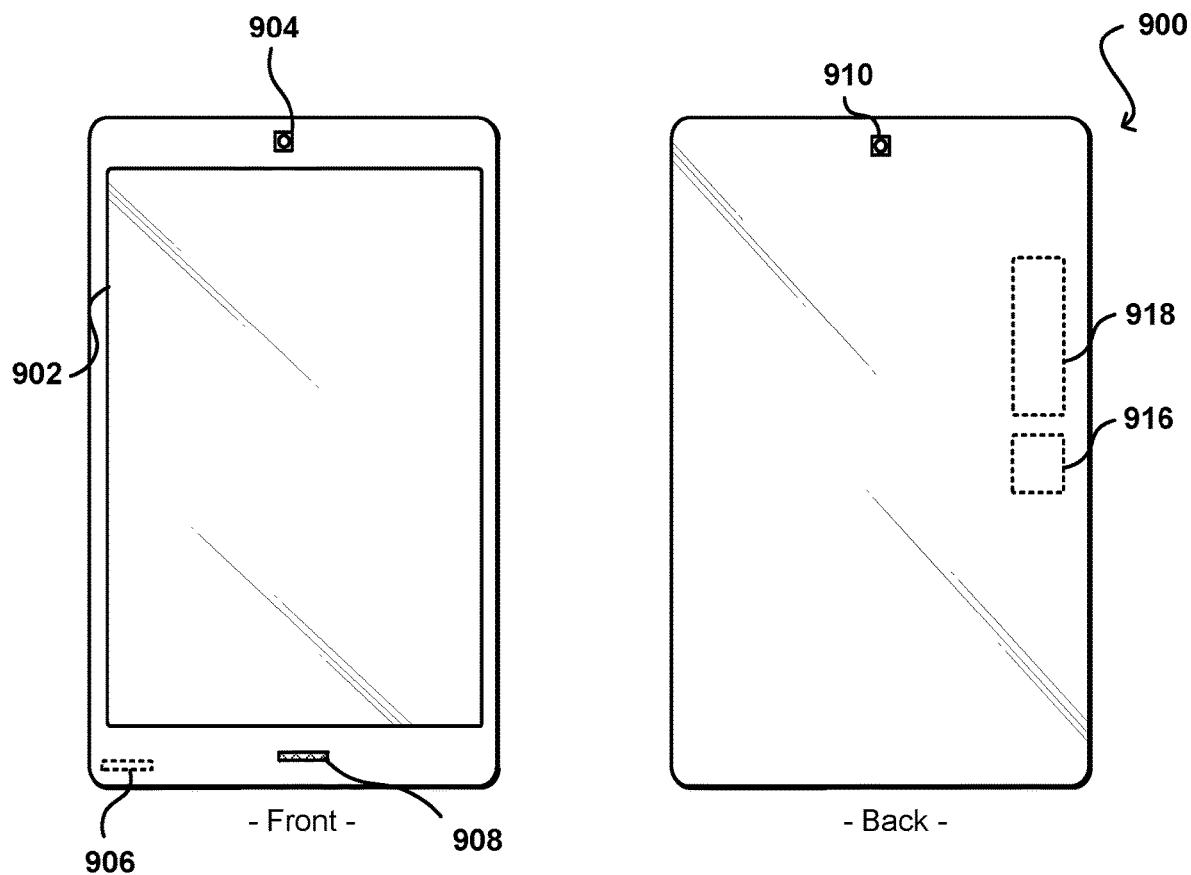
FIG. 9 illustrates an example computing device that can execute a gaming application in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display screen of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 908 on the front side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 906, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
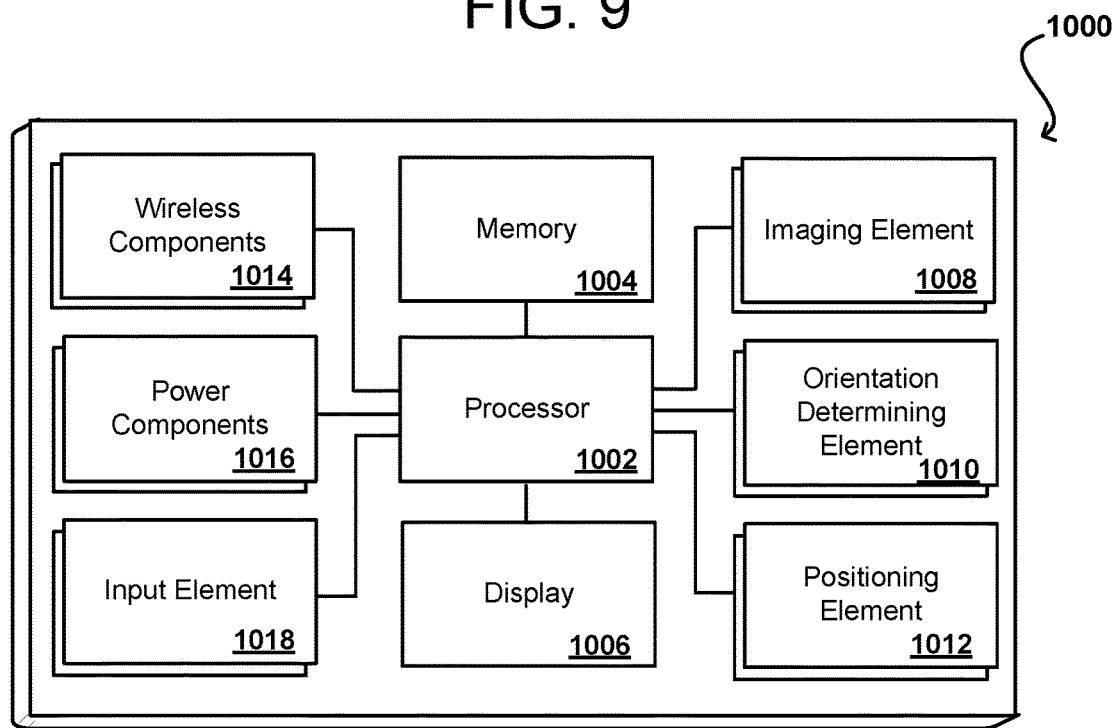
FIG. 10 illustrates example components of a computing device that can be used to implement aspects of the various embodiments.

FIG. 10 illustrates a set of basic components of an electronic computing device 1000 such as the device 1000 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device.

The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, to a visual scripting system, a request to specify an action for a multi-dimensional gameplay element;
   determining a three-dimensional model for the multi-dimensional gameplay element;
   determining a bounding box corresponding to the three-dimensional model, the bounding box specifying locations at which to execute an action instruction associated with an aspect of a two-dimensional mesh;
   rendering, based at least in part on the three-dimensional model and the bounding box, the two-dimensional mesh corresponding to the multi-dimensional gameplay element, the two-dimensional mesh being displayed via an interface of the visual scripting system;
   receiving, via the interface, the action instruction; and
   causing, during a gameplay session, the action to be performed for the multi-dimensional gameplay element in response to an action criterion being satisfied with respect to the aspect of the two-dimensional mesh.

2. The computer-implemented method of claim 1, further comprising:
   providing a graphical element for the action instruction enabling specification of at least one of an input port, an output port, or an element link for the aspect of the two-dimensional mesh.

3. The computer-implemented method of claim 1, wherein the aspect of the two-dimensional mesh includes at least one of a skeleton, a mesh feature, or a bounding box.

4. The computer-implemented method of claim 1, wherein the visual scripting system supports a plurality of linkable nodes for generation of a gaming application, and further comprising:
   linking a first two-dimensional node, associated with the aspect of the two-dimensional mesh, to a second two-dimensional node, associated with a two-dimensional object.

5. The computer-implemented method of claim 4, further comprising:
   displaying, via the interface of the visual scripting system, a link between the first two-dimensional node and the second two-dimensional node, wherein the link is rendered to indicate routing around one or more intermediate scripting nodes.

6. The computer-implemented method of claim 1, further comprising:
   receiving a set of rules with respect to a scripting node for the two-dimensional mesh; and
   enforcing the set of rules during the gameplay session.

7. The computer-implemented method of claim 1, further comprising:
   associating multiple scripting nodes with aspects of the two-dimensional mesh; and
   displaying the multiple scripting nodes as separate graphical elements with respect to the two-dimensional mesh.

8. The computer-implemented method of claim 7, further comprising:
   receiving a request to filter the multiple scripting nodes, wherein only a subset of the scripting nodes is concurrently displayed via the interface.

9. A system, comprising:
   at least one processor; and
   memory including instructions that, when executed by the at least one processor, cause the system to:
   receive, to a visual scripting system, a request to specify an action for a multi-dimensional gameplay element;
   determine a multi-dimensional model for the multi-dimensional gameplay element;
   determine a bounding box corresponding to the multi-dimensional model, the bounding box specifying locations at which to execute an action instruction associated with an aspect of a two-dimensional mesh;
   render, based at least in part on the three-dimensional model and the bounding box, the two-dimensional mesh corresponding to the multi-dimensional gameplay element, the two-dimensional mesh being displayed via an interface of the visual scripting system;
   receive the action instruction; and
   cause, during a gameplay session, the action to be performed for the multi-dimensional gameplay element in response to an action criterion being triggered with respect to the aspect of the two-dimensional mesh.

10. The system of claim 9, wherein the instructions when executed further cause the system to:
   provide a graphical element for the action instruction enabling specification of at least one of an input port, an output port, or an element link for the aspect of the two-dimensional mesh.

11. The system of claim 9, wherein the aspect of the two-dimensional mesh includes at least one of a skeleton, a mesh feature, or a bounding box.

12. The system of claim 9, wherein the visual scripting system supports a plurality of linkable nodes for generation of a gaming application, and wherein the instructions when executed further cause the system to:
   link a first two-dimensional node, associated with the aspect of the two-dimensional mesh, to a second two-dimensional node, associated with a two-dimensional object; and
   display, via the interface of the visual scripting system, a link between the first two-dimensional node and the second two-dimensional node, wherein the link is rendered to indicate routing around one or more intermediate scripting nodes.

13. The system of claim 9, wherein the instructions when executed further cause the system to:
   associate multiple scripting nodes with aspects of the two-dimensional mesh; and display the multiple scripting nodes as separate graphical elements with respect to the two-dimensional mesh.

14. A non-transitory computer readable medium comprising instructions that, when executed by the at least one processor causes the at least one processor to:
receive, to a visual scripting system, a request to specify an action for a multi-dimensional gameplay element;
determine a multi-dimensional model for the multi-dimensional gameplay element;
determine a bounding box corresponding to the multi-dimensional model, the bounding box specifying locations at which to execute an action instruction associated with an aspect of a two-dimensional mesh;
render, based at least in part on the three-dimensional model and the bounding box, the two-dimensional mesh corresponding to the multi-dimensional gameplay element, the two-dimensional mesh being displayed via an interface of the visual scripting system;
receive the action instruction; and
cause, during a gameplay session, the action to be performed for the multi-dimensional gameplay element in response to an action criterion being triggered with respect to the aspect of the two-dimensional mesh.

15. The non-transitory computer readable medium of claim 14, wherein the instructions, when executed by the at least one processor, further causes the at least one processor to:
provide a graphical element for the action instruction enabling specification of at least one of an input port, an output port, or an element link for the aspect of the two-dimensional mesh.

16. The non-transitory computer readable medium of claim 14, wherein the instructions, when executed by the at least one processor, further causes the at least one processor to:
link a first two-dimensional node, associated with the aspect of the two-dimensional mesh, to a second two-dimensional node, associated with a two-dimensional object; and
display, via the interface of the visual scripting system, a link between the first two-dimensional node and the second two-dimensional node, wherein the link is rendered to indicate routing around one or more intermediate scripting nodes.

* * * * *